Feb. 27, 1940.　　　A. L. N. FLEMING　　　2,191,444
SPLIT UNIT
Filed May 14, 1938
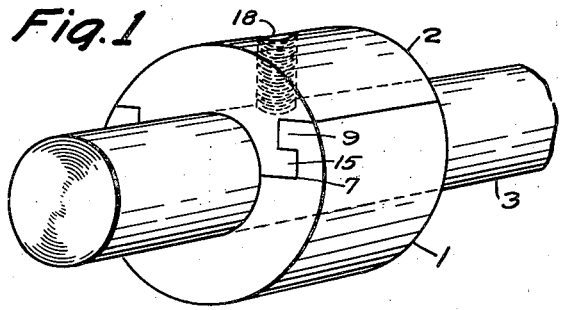
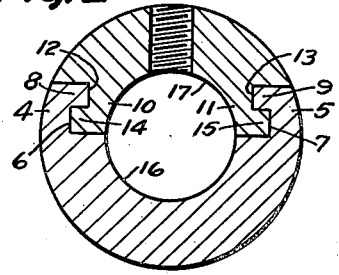
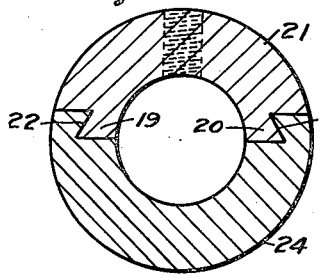
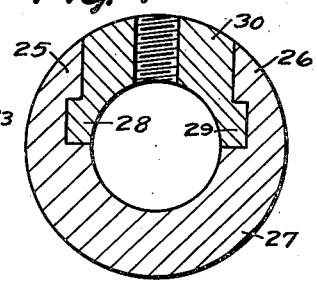
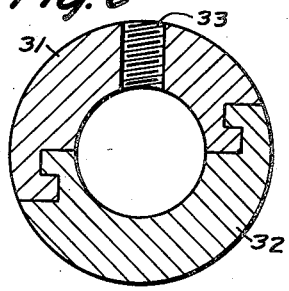
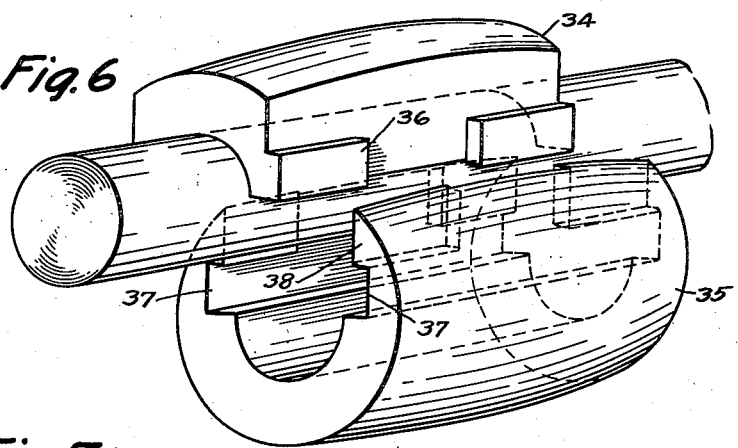
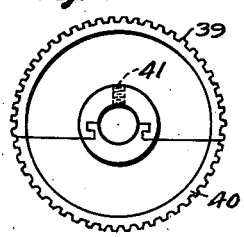
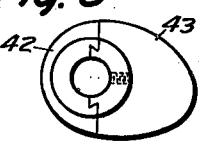
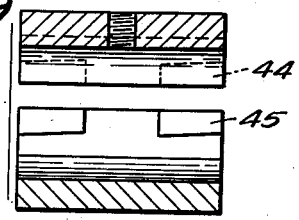
INVENTOR.
Augustine L. N. Fleming
BY
James Harrison Bowen
ATTORNEY.

Patented Feb. 27, 1940

2,191,444

UNITED STATES PATENT OFFICE 2,191,444

SPLIT UNIT

Augustine L. N. Fleming, Rutherford, N. J.

Application May 14, 1938, Serial No. 207,981

2 Claims. (Cl. 287—52.03)

The purpose of this invention is to provide a split unit, such as a pulley, set-collar, or the like, which is made in two halves or parts and adapted to be secured on a shaft or the like, in which one part inter-locks in the other, providing additional locating and holding means in combination with a set screw or the like.

The invention is a unit having two parts adapted to be positioned around a shaft or other object, in which one part forms a male and the other a female member, with the one adapted to slide into the other, positioning and holding one part in relation to the other, and in which one part is provided with a screw coacting with the shaft or the like and the inter-locking parts, forming a complete, solid unit rigidly secured together, and to the shaft or the like.

There are many forms of split collars, pulleys, gears, and the like, which are formed in two halves, and the two halves bolted together by bolts or screws at the sides of the shaft, and it is always difficult to locate one half in relation to the other, and, furthermore, the strength of the joint is always dependent upon the bolts, whereas, by providing tongues on one part adapted to slide into grooves on the other, it is possible to provide securing and holding means in the metal of the object, so that the object in turn forms a complete unit and is not dependent upon bolts or screws, and both parts are securely held by one or more set screws which draw the parts together, causing a permanent, rigid bind between the parts thereof; and, whereas nuts very often work loose, a set screw, which forms a wedge by which it is forced against the threads, very seldom works loose, and, therefore, one may be assured of a permanent unit without danger of the parts separating or working loose while the machine or device is in operation.

The object of this invention is, therefore, to provide improvements in the construction of split collars, pulleys, and the like, in which the structural parts of the objects provide the holding means, and are, therefore, only dependent upon a set screw for holding one part in relation to the other.

Another object is to eliminate the possibility of nuts and bolts working loose in split objects by eliminating all nuts and bolts generally used for holding the two parts together.

Another object is to provide a split unit, such as a collar, pulley, or the like, in which parts of one section thereof inter-lock in corresponding parts of another section, forming an integral and permanent bind between the two sections, eliminating the usual bolts as the holding means.

A further object is to provide a split unit in which one section is definitely located and secured in the other.

And a still further object is to provide a split unit, such as a pulley, collar, or the like, in which bolts for holding the unit together are replaced by inter-locking lugs or tongues in grooves which is of a simple and economical construction.

With these ends in view the invention embodies a set-collar, pulley, or the like formed in two sections adapted to be positioned about a shaft or the like, with upwardly extending parts of one section having internal grooves therein, and downwardly extending parts of the other section with outwardly extending tongues adapted to slide into the grooves of the upwardly extending parts of the other section, providing inter-locking parts holding one section in relation to the other, and a set screw positioned to urge one part away from the other, providing binding in the inter-locking parts and forming a positive, permanent unit and, at the same time, adapted to be readily separated.

Other features and advantages of the invention will appear from the following description, taken in connection with the drawing, wherein:

Figure 1 is a view showing a split set-collar or pulley having tongues and grooves in combination with the set screw.

Figure 2 is a cross section through the collar shown in Figure 1.

Figure 3 is a view showing an alternate design in which the tongues and grooves are dovetailed.

Figure 4 is a similar section showing another alternate design, in which the sides of one section are extended upward.

Figure 5 is a similar section showing another alternate design, in which both halves of the device are identical.

Figure 6 is a view, similar to that shown in Figure 1, showing an alternate design in which a plurality of lugs may be provided instead of continuous tongues and grooves.

Figure 7 is a detail showing the device shown in Figure 1 applied to a gear.

Figure 8 is a similar view showing the device applied to a cam.

Figure 9 is a view showing another alternate design in which the engaging surfaces of lugs are slightly inclined.

In the drawing the device is illustrated as it may be made, wherein numeral 1 indicates the lower section of a collar, pulley, or the like, numeral 2, an upper section, and numeral 3, a shaft upon which the device may be used.

In the design shown in Figures 1 and 2 the part 1 is provided with upwardly extending jaws or parts 4 and 5 having grooves 6 and 7 on their inner surfaces, and overlapping or extending tongues 8 and 9; and the upper part 2 is provided with downwardly extending sections 10 and 11 having grooves 12 and 13 to accommodate the tongues 8 and 9, and also tongues 14 and 15 extending into the grooves 6 and 7. The two parts are placed upon a shaft with semicircular openings 16 and 17 at the center resting upon the shaft, and with one section beyond the end of the other, and, with the parts in this position, they may be moved along the shaft so that the tongues of one section slide into the grooves of the other, forming a complete unit as shown in Figure 1. When the parts are in place, a set screw may be inserted in the opening 18, as shown, and it will be noted that the set screw will draw the upper part 2 upward in relation to the part 1, thereby providing a continuous bind between the tongues and grooves, and positively locking the two parts together, and, at the same time, locking the parts on the shaft.

It will also be understood that any suitable tongues and grooves may be used, and these may be of any shape or formed in any manner. In the design shown in Figure 3 the upper and lower parts are provided with what is commonly known as a dovetailed joint, with tongues 19 and 20 on an upper part 21 extending into grooves 22 and 23 in a lower part 24, and with the engaging surfaces beveled as shown. These parts are assembled similar to the parts shown in Figure 2.

The design shown in Figure 4 is similar to that shown in Figure 2 except that the upper parts 25 and 26 of the lower part 27 extend continuously upward over the tongues 28 and 29 of the upper part 30, and, in the design shown in Figure 5, the parts are formed exactly as shown in Figure 2, except that both halves 31 and 32 are exactly alike and may be die cast or formed from the same mold, or may be made from a continuous bar of stock and cut off. One part only, however, is provided with a set screw opening 33, however, it will be understood that this may be provided in either of the parts.

In the design shown in Figure 6 a small pulley is illustrated having an upper part 34 and a lower part 35, and the upper part is provided with lugs 36 which extend into grooves 37 in the lower part, with overhanging parts 38 of the lower part 35 overlapping the lugs 36 and providing holding means. This form is substantially the same as that shown in Figure 4, and it will be understood that it may also be made with the grooves formed as shown in Figures 2 and 3, the only difference being that slots are provided in the grooves so that the two parts may be moved vertically toward each other and assembled on a shaft without requiring a space equal to twice the length of the device. It will also be understood that these tongues and grooves may be slotted substantially forming gear teeth, so that it is only necessary for the end of one part to extend slightly beyond the end of the other in assembling.

Figure 7 illustrates a connection similar to that shown in Figure 2 applied to a split gear with an upper part 39 and a lower part 40, in which the grooves are formed in a hub 41, and it will be understood that this manner of holding the two halves together may be applied to gears of any size or type, or formed in any manner; and in Figure 8 a split cam is illustrated with an upper section 42 and a lower section 43.

In the design shown in Figure 9 a slight deviation is made in the manner of forming the tongues and grooves in that the upper surfaces of the lugs 44, similar to the lugs 36 of the design shown in Figure 6, are slightly inclined, and the lower surfaces of the corresponding lugs 45, similar to the parts 38 of the design shown in Figure 6, are correspondingly inclined so that, as the two parts are moved together, they will bind upon the shaft, and one will be rigid in relation to the other so that, as the set screw is applied, it will provide a positive lock positively securing one part in relation to the other.

It will be understood that, although one set screw only is described and shown in each unit, two, or any number of set screws may be used depending upon the length of the unit.

It will be understood that other changes may be made without departing from the spirit of the invention. One of which changes may be in the use of tongues and grooves or dove-tailed joints of any other type or design, another may be in the use of other locking means, another may be in the use of the device on a shaft or other object of any other shape instead of being round as shown, and still another may be in the use of these tongues and grooves for holding the two halves together for objects of any other type or design.

The construction will be readily understood from the foregoing description. In use the two parts may be provided as shown and described, and, when it is desired to install the device on a shaft or the like, one is held against each side of the shaft, with one part extending beyond the end of the other, and, as the two parts are then slid or moved along the shaft, the tongues of one will slide into the grooves of the other, so that a complete unit is provided, and then a set screw, or a plurality of set screws, may be applied which will form binding means positively locking both parts together, and, at the same time, locking the unit upon the shaft or the like. The device may also be readily removed in the same manner, or it may be moved along the shaft from one position to another by loosening only the set screw or screws. This device is inexpensive, has no protruding lugs or screws, no nuts to work loose, may be rapidly and easily assembled or dismantled, and forms a positive concentric unit about the shaft.

Having thus fully described the invention, what I claim as new, and desire to secure by Letters Patent, is:

1. A split unit comprising two portions, each portion having a semicircular recess to embrace half of a shaft, one portion having spaced longitudinally extending lugs at each side of the recess, and the other portion having longitudinally extending grooves to receive the lugs of the former portion, one side of each groove defining an overhanging lip, transverse slots through said lips, the lugs of the former portion adapted to pass through the transverse slots in the lips of the latter portion on assembling, where the one portion is placed on a shaft only partially opposite the other and slid axially of the shaft, whereby the lugs enter the grooves until the lugs are in overlapping relation with the lips and in holding position, and set screws fixedly attaching the said portions to the shaft or the like.

2. A split unit of the type adapted to be locked upon a shaft comprising two portions, each portion having a semicircular recess to embrace half of a shaft, with male parts of a dovetail on one portion and female parts on the other adapted to be assembled on a shaft or the like by sliding one portion into holding relation with the other, and in combination therewith a set screw securing both of the said portions together and locking the unit upon a shaft or the like; said unit characterized in that the dovetail of the male portion comprises spaced longitudinally extending lugs at each side of the recess, and the female portion has longitudinally extending grooves to receive the lugs of the male portion with one side of each groove defining an overhanging lip, transverse slots through said lips, the lugs of the male portion adapted to pass therethrough, whereby in assembling the two portions are placed upon a shaft, with one on each side thereof and in partially overlapped axial relation, and slid axially of the shaft, wherein the lugs enter the grooves until the lugs are in overlapping relation with the lips and in holding position.

AUGUSTINE L. N. FLEMING.